(12) United States Patent
Deakin et al.

(10) Patent No.: US 12,716,468 B2
(45) Date of Patent: Aug. 25, 2026

(54) FLYWHEEL CONTAINMENT WITH EXTERNAL TOUCHDOWN RINGS AT REDUCED DIAMETER

(71) Applicant: Punch Flybrid Limited, Silverstone (GB)

(72) Inventors: Andrew Deakin, Silverstone (GB); Andrew Early, Silverstone (GB)

(73) Assignee: PUNCH FLYBRID LIMITED, Silverstone (GB)

( * ) Notice: Subject to any disclaimer, the term of this patent is extended or adjusted under 35 U.S.C. 154(b) by 28 days.

(21) Appl. No.: 18/553,052

(22) PCT Filed: Mar. 30, 2022

(86) PCT No.: PCT/GB2022/050791
§ 371 (c)(1),
(2) Date: Sep. 28, 2023

(87) PCT Pub. No.: WO2022/208075
PCT Pub. Date: Oct. 6, 2022

(65) Prior Publication Data

US 2024/0183425 A1 Jun. 6, 2024

(30) Foreign Application Priority Data

Mar. 30, 2021 (GB) ...................................... 2104487

(51) Int. Cl.
*F16F 15/315* (2006.01)

(52) U.S. Cl.
CPC ...... *F16F 15/3156* (2013.01); *F16F 2230/04* (2013.01)

(58) Field of Classification Search
CPC ............................ F16F 15/315; F16F 15/3156
See application file for complete search history.

(56) References Cited

U.S. PATENT DOCUMENTS 4,208,921 A * 6/1980 Keyes .................... B60K 6/105 74/572.1
4,819,502 A * 4/1989 Nakajima .............. H02K 7/025 310/68 E (Continued)

FOREIGN PATENT DOCUMENTS

EP 2829727 7/2023
GB 2491675 A * 12/2012 .......... F16C 32/0402

(Continued)

OTHER PUBLICATIONS

Vesselinov, Vladimir; International Search Report; Jul. 5, 2022; 2 pages; Rijswijk.

*Primary Examiner* — Daniel D Yabut
(74) *Attorney, Agent, or Firm* — STETINA GARRED BRUCKER & NEWBOLES

(57) ABSTRACT

Apparatus for containing a flywheel comprising: a flywheel; a shaft; a bearing arrangement for supporting the shaft; and a housing for housing the flywheel, the shaft and the bearing arrangement; wherein the flywheel is mounted on the shaft, the shaft is mounted to the bearing arrangement, and the bearing arrangement is mounted to the housing; wherein the flywheel has a rim formed by a circumferential face of the flywheel, and a hub formed by a central region of the flywheel, the hub being wider, axially, than the rim such that a circumferential contact surface is formed by the hub that is coaxial with the rim; wherein the housing comprises an annular force transfer region that faces, and is concentric with, the contact surface; and wherein, in use, excessive radial movement of the flywheel results in the contact surface contacting the transfer region.

22 Claims, 5 Drawing Sheets

(56) References Cited

U.S. PATENT DOCUMENTS

| | | | | |
|---|---|---|---|---|
| 5,588,754 | A * | 12/1996 | Miller | F16C 39/02 384/615 |
| 6,630,761 | B1 * | 10/2003 | Gabrys | F16F 15/315 310/90 |
| 6,664,680 | B1 * | 12/2003 | Gabrys | F16F 15/3156 310/90.5 |
| 6,727,616 | B1 * | 4/2004 | Gabrys | F16C 32/0417 310/90 |
| 2008/0284267 | A1 | 11/2008 | Purvines | |
| 2010/0206126 | A1 | 8/2010 | Spears et al. | |
| 2018/0023661 | A1 * | 1/2018 | Early | F16C 35/077 74/572.11 |

FOREIGN PATENT DOCUMENTS

| | | |
|---|---|---|
| JP | 60141140 | 7/1985 |
| JP | 6162339 | 3/1986 |

* cited by examiner

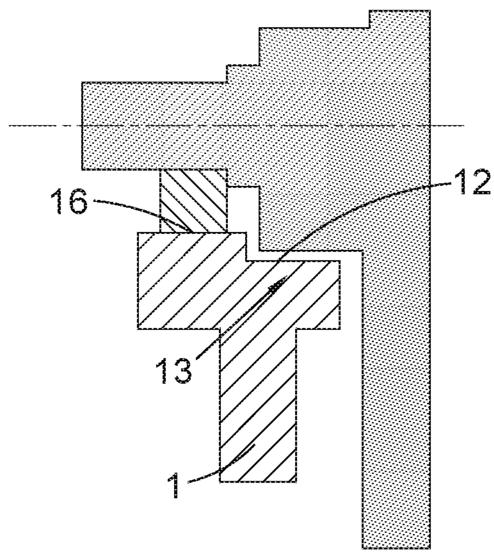
FIG. 3
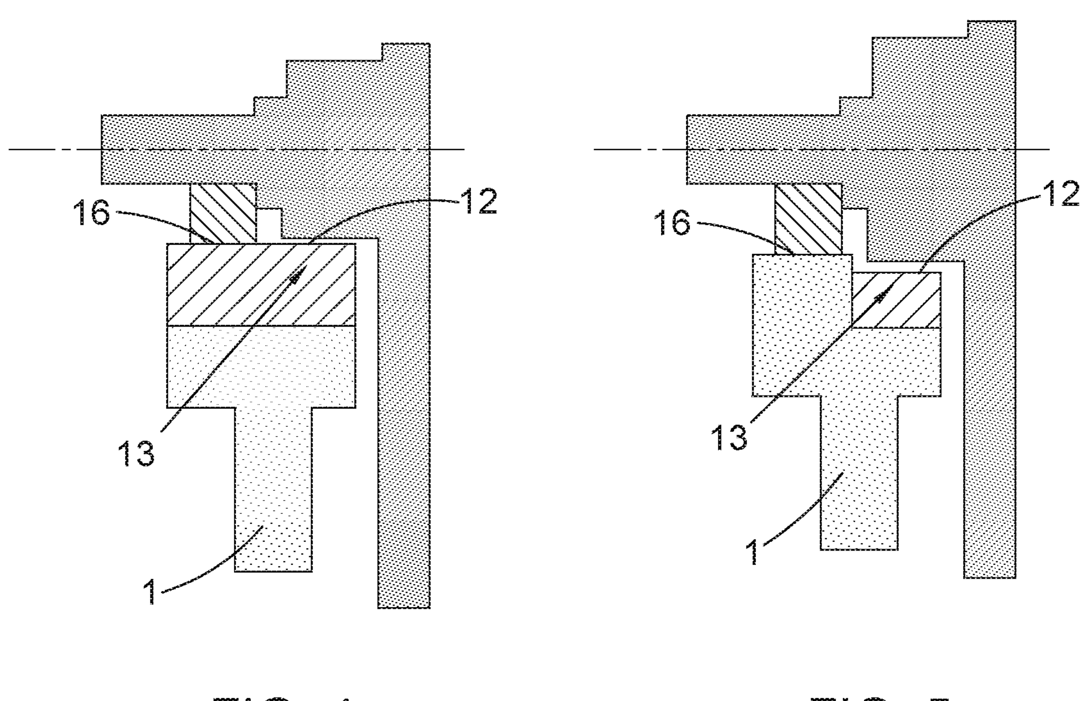
FIG. 4
FIG. 5

FLYWHEEL CONTAINMENT WITH EXTERNAL TOUCHDOWN RINGS AT REDUCED DIAMETER

CROSS-REFERENCE TO RELATED APPLICATIONS

The present application claims priority to PCT International Patent Application No. PCT/GB2022/050791, filed Mar. 30, 2022, and Great Britain Patent Application No. 2104487.0, filed on Mar. 30, 2021, the disclosures of which are incorporated herein by reference.

STATEMENT RE: FEDERALLY SPONSORED RESEARCH/DEVELOPMENT

Not Applicable

BACKGROUND

This invention relates to apparatus for containing a flywheel. In particular, the apparatus comprises touchdown rings either side of the flywheel at a reduced diameter relative to the diameter of a rim of the flywheel.

BACKGROUND OF THE INVENTION

A flywheel for energy storage and recovery is typically mounted on a shaft in a housing such that the flywheel and the shaft move substantially together. The shaft is mounted on the housing via a bearing arrangement which allows the shaft (and thus the flywheel) to rotate relative to the housing. Kinetic energy can be stored in the flywheel by increasing the flywheel's speed of rotation. Energy can be recovered from the flywheel by transferring the flywheel's rotational energy to another entity, such as a vehicle drive shaft. In other words, the flywheel can be charged and discharged with kinetic energy.

A flywheel which rotates at high speeds (e.g. speeds in excess of 10,000 rpm) experiences large air resistance (or 'windage') forces, because of the high tip speed of the flywheel. This leads to loss of kinetic energy from the flywheel. To reduce such losses, a vacuum pump may be used to at least partially evacuate a chamber within the housing, the flywheel being positioned within the chamber. Evacuating the chamber lowers the pressure within the chamber, optimally to approximately a vacuum level, meaning that the flywheel experiences less air resistance as it rotates in the chamber.

The flywheel and the housing may in some circumstances undergo translational movement relative to one another (in addition to the intended rotational movement relative to each other). Translational movement of the flywheel and the housing relative to each other may include, for example, vibrational motion of the flywheel and the shaft within the housing.

In the event of a failure of the bearing arrangement and/or shaft, the flywheel may directly contact the housing with significant force, causing structural damage to the housing and generating a torque reaction in the housing which may result in the structural failure of the housing and/or mounts associated with the housing. This is the result of a lack of adequate control of the flywheel during such a failure event, and a large distance between the contact regions of the flywheel and the housing.

One solution to this problem is to structurally reinforce the housing adjacent to an outer diameter of the flywheel to absorb impact forces of the flywheel more adequately during a failure event. However, modifying the housing in this way can be expensive and add significant weight to the housing, which is undesirable.

Another solution, such as in the application GB2449282, is to closely fit rings between a rim of the flywheel and the housing to arrest the flywheel during a failure event. However, this type of flywheel design results in significant stress in the rim which overhangs the rings, significantly reducing the longevity of the flywheel due to structural fatigue. The longevity of such a flywheel can be improved by adding carbon material to the rim to reinforce the flywheel. However, this carbon modification adds significant cost, and the type of hub required for this design is expensive to machine, even when the hub is formed via a forging.

The present invention aims to overcome or at least ameliorate one or more of the problems set out above.

SUMMARY OF THE INVENTION

In a first aspect of the invention, there is provided apparatus for containing a flywheel comprising: a flywheel; a shaft; a bearing arrangement for supporting the shaft; and a housing for housing the flywheel, the shaft and the bearing arrangement; wherein the flywheel is mounted on the shaft, the shaft is mounted to the bearing arrangement, and the bearing arrangement is mounted to the housing; wherein the flywheel has a rim formed by a circumferential face of the flywheel, and a hub formed by a central region of the flywheel, the hub being wider, axially, than the rim such that a circumferential contact surface is formed by the hub that is coaxial with the rim; wherein the housing comprises an annular force transfer region that faces, and is concentric with, the contact surface; and wherein, in use, excessive radial movement of the flywheel results in the contact surface contacting the transfer region.

In this way, the flywheel is constrained to contact the housing during a failure event via a force transfer region that has a reduced diameter relative to a flywheel that is arranged to touch down at the housing which radially surrounds the rim. This is advantageous because the impact force of the flywheel contacting the housing, as well as the induced torque reaction in the housing from this impact, is significantly reduced relative to the latter arrangement. Further, it is easier and cheaper to reinforce the housing at this reduced diameter, allowing the impact forces of the flywheel to be more optimally controlled and distributed into the housing. This results in a mounting system of the flywheel which is less likely to fail during a failure event, whilst minimising the cost, to manufacture, and weight of the mounting system.

Preferably, a clearance between the contact surface and the transfer region is less than 0.5 mm, preferably less than 0.2 mm. In this way, impact forces due to contact between the flywheel and the housing can be reduced, as the clearance is relatively small.

Preferably, a lubricant system is arranged to circulate lubricant to the bearing arrangement, wherein a distal edge of the contact surface comprises a lip for preventing lubricant from the bearing arrangement reaching the clearance. In this way, the clearance is not filled with lubricant, thus maintaining an air gap which minimises drag on the flywheel.

Preferably, the housing proximate to the lip comprises a groove for collecting lubricant from the lip. In this way, lubricant does not pool around the lip.

Preferably, the groove is configured to drain collected lubricant to the lubricant system.

Preferably, the housing between the bearing arrangement and the transfer region comprises one or more drainage channels to drain lubricant to the lubricant system.

Preferably, the transfer region comprises a channel to facilitate lubricant circulation to the bearing arrangement.

Preferably, the housing is shaped to create a venturi with the flywheel that is arranged to maintain the groove at a low-pressure for drawing lubricant from the bearing arrangement. In this way, lubricant from the bearing arrangement is drawn away from the clearance and into the groove.

Preferably, the bearing arrangement is coaxial with the contact surface. In this way, the tolerance of the respective transfer region and the contact surface 10 can be improved.

Preferably, a diameter of the transfer region is less than a diameter of the rim and/or the housing which encircles the rim. In this way, torque reaction due to contact between the flywheel and the housing can be reduced, as the flywheel contacts the housing at a reduced diameter relative to an arrangement whereby the flywheel contacts the housing which encircles the rim.

Preferably, the transfer region diameter is ⅓ or less of the diameter of the rim and/or the housing which encircles the rim.

Preferably, the transfer region is formed via an annular member that is mounted to the housing. In this way, the transfer region can be manufactured separately from the housing as desired. This may be beneficial if the transfer region is desired to be a different material to that of the housing.

Preferably, the transfer region is formed via an annular member that is integral with the housing. In this way, the transfer region can be machined into the housing. This may be beneficial if the transfer region is desired to be the same material as the housing.

Preferably, the housing comprises a bearing support upon which the bearing arrangement is mounted. In this way, the bearing arrangement, and vibrations and/or gyroscopic forces from the flywheel 3, can be supported.

Preferably, the transfer region is integral with the bearing support. This may be beneficial if the transfer region is desired to be the same material as the bearing support.

Preferably, the bearing support is integral with the housing. This may be beneficial if the bearing support is desired to be the same material as the housing.

Preferably, the bearing support is concentric with the bearing arrangement and/or coaxial with the transfer region. In this way, the clearance can be relatively small with relatively good tolerances. This small clearance, which is typically smaller than can be achieved at the rim, results in a reduced impact load if a bearing failure was to occur, which further reduces any resultant torque reaction on the housing.

Preferably, the diameter of the bearing support is substantially the same as the diameter of the transfer region.

Preferably, the bearing arrangement is mounted to the bearing support arrangement via an elastomeric component. In this way, any multi-body resonance that occurs as a result of the interaction between the housing and flywheel is reduced.

Preferably, the bearing arrangement is mounted to the elastomeric component via a bearing carrier.

Preferably, the elastomeric component is co-moulded onto the bearing carrier. In this way, the bearing carrier can be more easily manufactured.

Preferably, the elastomeric component comprises voids to facilitate elastic or thermal expansion of the elastomeric component.

Preferably, a space between the transfer region and the bearing arrangement is preferably less than 5 mm. In this way, the tolerance of the respective transfer region and the contact surface 10 can be less than 50 microns, i.e. improved.

Preferably, the transfer region is located between the bearing arrangement and the flywheel.

Preferably, the housing proximate to the transfer region is structurally reinforced by thicker and/or denser materials and/or structural elements. In this way, impact forces from the flywheel can be better attenuated and distributed into the housing.

Preferably, at least one of: the flywheel, and the transfer region comprise a coating to reduce friction during contact between the contact surface and the transfer region. In this way, the flywheel can be more arrested with reduced torque reaction by the transfer region during a failure event.

Preferably, the transfer region comprises a material that is more durable than the housing. In this way, the housing can be a cheaper and/or less dense material, allowing a cheaper and/or lighter weight arrangement to be produced.

Preferably, a controller is arranged to cease operation of the flywheel in response to detecting a torque reaction of the flywheel and/or housing above a pre-determined torque reaction threshold. In this way, further structural damage of the housing (i.e. as a result on continued flywheel operation, and thus continued impact forces induced on the housing) can be mitigated.

Preferably, the transfer region comprises a material with a coefficient of friction less than 0.25. Preferably, the transfer region comprises a low thermal conduction material, such as less than 45 watts per meter kelvin, preferably less than 10 watts per meter kelvin. In this way, the flywheel is more stable as it contacts the touchdown ring (relative to arrangements with higher coefficients of friction) and most of the heat energy generated from contact between the flywheel and touchdown ring is transferred into the flywheel, which typically has a high mass (relative to the touchdown ring and surrounding housing), which therefore readily absorbs the heat energy.

BRIEF DESCRIPTION OF THE DRAWINGS

These and other features and advantages of the various embodiments disclosed herein will be better understood with respect to the following description and drawings, in which like numbers refer to like parts throughout, and in which:

Embodiments of the invention will now be described by way of example, with reference to the drawings in which:

FIG. 3 illustrates an embodiment of the invention whereby the diameter of the touchdown region differs from the diameter of the bearing support;

FIG. 4 illustrates an embodiment of the invention whereby the touchdown region and bearing support are separate components from the housing and integral with one another;

FIG. 5 illustrates an embodiment of the invention whereby the touchdown region is a separate component from the housing, and the bearing support is integral with the housing;

DETAILED DESCRIPTION

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

The present embodiments represent the best ways currently known to the applicant of putting the invention into practice, but they are not the only ways in which this can be achieved. They are illustrated, and they will now be described, by way of example only.

Figure 1:
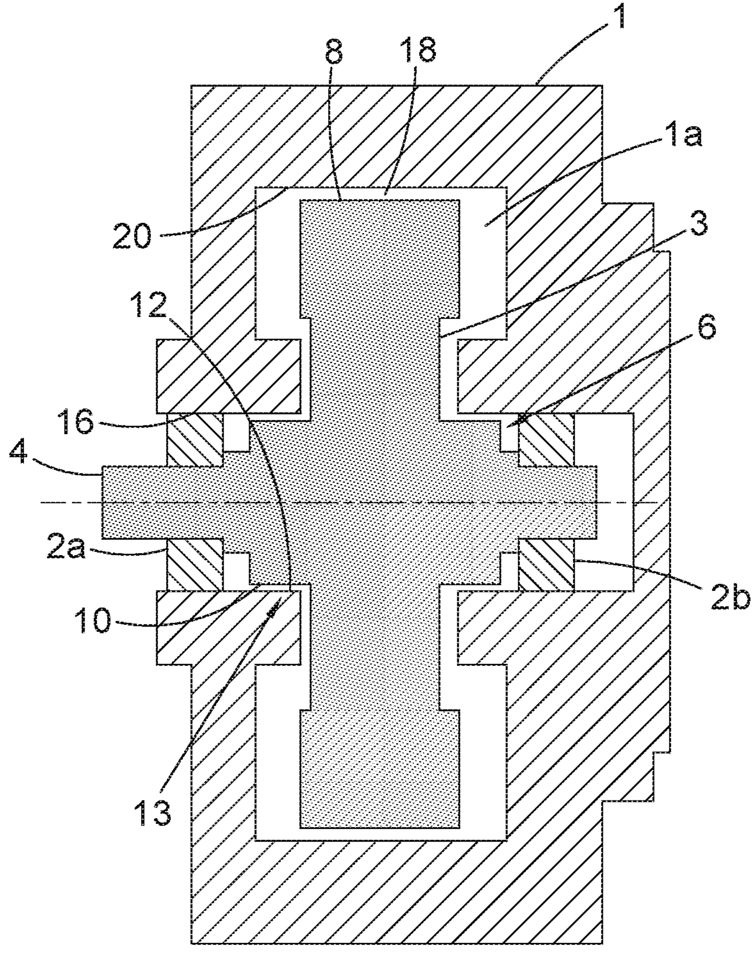
FIG. 1 illustrates a schematic cross section of apparatus for containing a flywheel.

With reference to FIG. 1, a flywheel 3 is mounted on a shaft 4 in an evacuated chamber 1*a* within a housing 1. The flywheel 3 is mounted on the shaft 4 such that the flywheel 3 and the shaft 4 can move (in particular, rotate) substantially together, generally as one mass. The flywheel 3 and the shaft 4 may, for example, be integrally formed as a single component or may be formed as separate components.

The shaft 4 passes through an aperture of the housing 1 (see left-hand side of FIG. 1). The shaft 4 is mounted to the housing 1 via bearing arrangements 2*a*, 2*b* either side of the flywheel 3.

The bearing arrangements 2*a*, 2*b* are mounted on the housing 1 and constrained, such that they are substantially fixed in position relative to the housing 1. More specifically, the bearing arrangements 2*a*, 2*b* abut shoulders on the shaft 4 and are retained on the shaft 4 preferably via nuts (not shown) on opposing sides of the bearing arrangements which do not abut the shoulders. The bearing arrangements may move axially substantially together with the housing 1. In some embodiments, this may be achieved by axially constraining at least one of the bearing arrangements against the housing 1. The housing 1 and the bearing arrangements may also or alternatively move radially (i.e. in a direction substantially along a radial line of the shaft 4) substantially together.

The shaft 4 may translate relative to the housing 1, for example due to vibration of the flywheel 3 and the shaft 4, due to vibration or resonance of the flywheel 3 and the shaft 4 within the housing 1, or due to movement of the housing 1 imposed by accelerations of the apparatus in which the flywheel system is installed, such as a vehicle traversing rough terrain.

The flywheel shaft 4 may be linked to a neighbouring drive system (not shown) such as a flywheel drive transmission (that may include a CVD or a Clutched Flywheel Transmission) and permits relative movement of the flywheel 3 and the housing 1 via a drive member (not shown). The neighbouring drive system may itself be operatively coupled to a vehicle prime mover, a final drive or a part of the transmission between the two. Alternatively, it may be another energy source/sink for example, coupled via an electric or hydraulic motor/generator.

The flywheel 3 comprises a central region defining a hub 6, and an outer circumferential face distal from the hub 6 defining a rim 8. The hub 6 extends axially (in a direction substantially parallel to the longitudinal axis of the shaft 4) from both sides of the flywheel 3 such that the hub 6 is wider than the rim 8. As a result, a circumferential contact surface 10 is formed by the hub 6 either side of the flywheel 3. The hub 6 is substantially annular, thereby defining a substantially annular contact surface 10.

In use, radial and circumferential stresses in the flywheel 3 are highest at the core, or central portion, of the flywheel 3. Therefore, having a wider flywheel hub 6 (relative to a conventional flywheel with a narrower hub) reduces these stresses at the core by effectively spreading the stress over a larger volume of flywheel 3. This increases the longevity of the flywheel 3.

The housing 1 is shaped to accommodate the axial extension of the hub 6 and comprises a touchdown ring 13 either side of the flywheel 3 (i.e. on the left and on the right-hand side of FIG. 1. The contact surfaces, touchdown rings, and bearing arrangements are identical in structure and function and therefore only one of these sets of features will be described.

The touchdown ring 13 is substantially annular in shape and has an inner circumferential touchdown region 12 that faces the contact surface 10. The touchdown region 12 could also be denoted as a contact region. In this embodiment, the inner touchdown region 12 is continuous, i.e. does not comprise gaps. In some embodiments, the touchdown ring 13 may have a shape that provides a touchdown region 12 that is not continuous, i.e. the touchdown region does comprise gaps. For example, the touchdown ring 13 may have a castellated shape providing a touchdown region with one or more intermittent gaps.

The touchdown ring 13 is sufficiently near the flywheel 3 such that the touchdown region 12 is substantially concentric with the contact surface 10. In other words, the touchdown ring 13, and thus the touchdown region 12, circumferentially surrounds, and is located axially within, the contact surface 10. Less preferably, in some embodiments, the touchdown region may be slightly eccentric with the contact surface 10.

In this embodiment, the touchdown ring 13 is integral with the housing 1. This can be achieved by machining/shaping an appropriate area of the housing into the touchdown ring 13 such that when the flywheel 3 is installed/integrated with the housing 1, the touchdown region 12 faces the contact surface 10 as described above. In this case, the material of the touchdown ring 13 is therefore the same as the housing 1. In some embodiments, the touchdown ring 13 may be a different material to that of the housing that is pressed into the housing. In some embodiments, the touchdown ring 13 may be a separate component that is rigidly connected to the housing, for example using bolts—the material of the touchdown down ring may be different to that of the housing. The advantage of the touchdown ring being a different material to that of the housing will be explained later on.

The intended position of the flywheel 3 relative to the housing 1 may allow for an intended clearance, or intended clearances, in both a radial direction (a direction along a radial line of the shaft 4) and an axial direction between the flywheel 3 and the housing 1. The intended clearance(s) between the flywheel 3 and the housing 1 may allow for some relative radial and/or axial movement of the flywheel 3 and the housing 1 due to centrifugal forces and/or temperature changes of the flywheel when in use.

Figure 2:
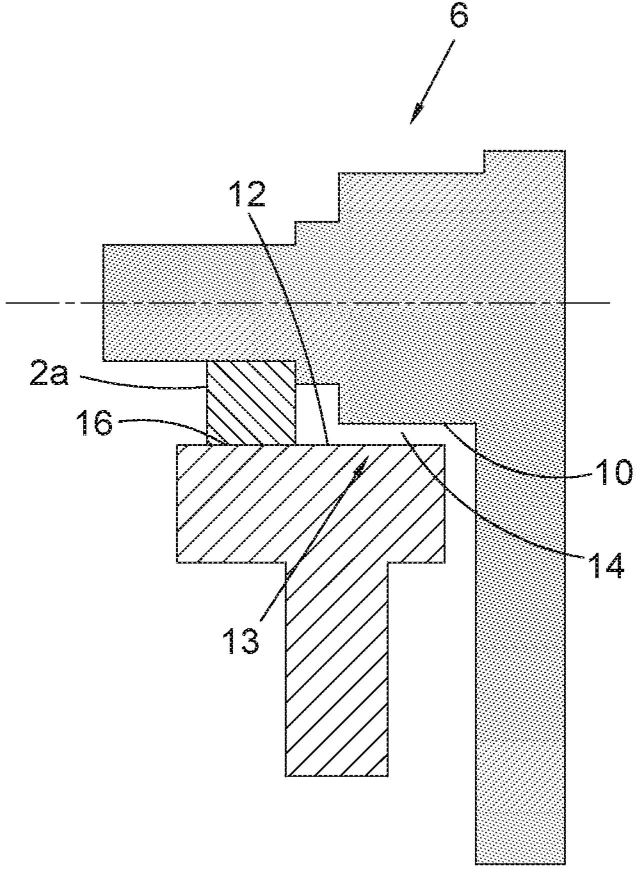
FIG. 2 illustrates a magnified view of the clearance in FIG. 1.

As illustrated by FIG. 2, there is a clearance 14 between the contact surface 10 and the touchdown region 12. Preferably, this clearance is less than 0.5 mm, preferably less than 0.2 mm.

The bearing arrangement 2*a* is mounted to the housing 1 via a bearing support 16. The bearing support is an area/portion of the housing 1 upon which the bearing arrangement 2*a* is mounted. In this embodiment, the bearing support 16 is the same material as the housing 1. In this way, the bearing support 16 is sufficiently strong such that it is able to accommodate vibrations and/or gyroscopic forces from the flywheel 3. In some embodiments, the bearing support 16 may be a separate component having a different, but similarly suitable material to that of the housing 1 for accommodating vibrations and/or gyroscopic forces from the flywheel 3. In this case, the bearing support 16 is mounted to the housing 1 such that it receives the bearing arrangement accordingly.

The bearing arrangement 2*a* is coaxial with the contact surface 10, and the bearing support 16 is coaxial with the touchdown region 12. The distance between the bearing arrangement 2*a* and touchdown region 12 is relatively small to minimise deflections of the shaft 4, preferably less than 10 mm, or more preferably less than 5 mm. These spatial relationships allow the clearance 14 to be relatively small, as the tolerance of the respective touchdown ring 13 and contact surface 10 can be less than 50 microns, the concentricity between the touchdown ring 13 and contact surface 10 being controlled directly by the bearing arrangement 2*a*. The importance of the size of the clearance 14 will be discussed later on.

In this embodiment, the diameter of the touchdown region 12 is substantially the same as the diameter of the bearing support 16. In this way, the touchdown region 12 and bearing support can be machined quickly and easily, as less processing steps are required. In some embodiments, as illustrated in FIG. 3, the diameter of the touchdown region 12 may not be the same as the bearing support 16—in this case the diameter of the touchdown region is greater than the diameter of the bearing support.

In some embodiments, as illustrated in FIG. 4, the bearing support 16 is integral with the touchdown ring 13—in this embodiment, the touchdown ring 13 is a separate component that is integral with the bearing support 16, i.e. formed together from the same material, and rigidly connected to the housing, which is a different material to that of the touchdown ring 13 and bearing support 16. In other embodiments, as illustrated in FIG. 5, the bearing support 16 is integral with the housing, i.e. formed together from the same material, and the touchdown ring 13 is a separate component of a different material to that of the housing that is rigidly connected to the housing.

The purpose of the touchdown ring 13 is to allow containment of the flywheel 3 in the event of a failure of the bearing arrangement 2*a*, 2*b* and/or the shaft 4. The skilled person will understand the various reasons for failure of the bearing arrangement and/or the shaft. Hereinafter, the term 'failure event' will be used to collectively refer to events of a failure of the bearing arrangement and/or the shaft.

During a failure event, the shaft 4, and thus the flywheel 3, is displaced from its longitudinal axis such that it rotates about a different axis from its longitudinal axis (i.e. about axis which is offset from the longitudinal axis of the shaft 4, and/or at an angle to the longitudinal axis of the shaft 4). In extreme cases, displacement of the flywheel 3 will inevitably result in contact between the flywheel 3 and the housing 1, inducing radial loads in the housing 1. More specifically, the contact surface 10 of the hub 6 will be displaced towards and contact the housing 1.

The clearance 14 is smaller than a second clearance 18 between the rim 8 and the rim housing 20 which radially surrounds the rim 8. This arrangement, as well as the positioning of the touchdown ring 13 relative to the contact surface 10, helps to ensure the contact surface 10 directly contacts the touchdown region 12 during a failure event instead of the rim 8 contacting the rim housing 20—the flywheel 3 is constrained to contact the housing 1 via the touchdown region 12.

The impact of the contact surface 10 contacting or 'touching down' on the touchdown region 12 creates a torque reaction in the housing 1. The touchdown ring 13 both transfers and attenuates touchdown forces from the flywheel 3 into the housing 1.

The touchdown ring 13 serves to arrest the flywheel 3 and preserve the structural integrity of the housing 1 by damping and more evenly distributing impact forces of the flywheel 3 into the housing 1 relative to the flywheel contacting the housing directly without the touchdown ring.

In other words, excessive radial movement of the flywheel 33 with respect to the housing 1, due to a failure event, will cause the flywheel 3 to contact the touchdown ring 13. These radial loads are distributed indirectly into the housing 1 via the touchdown ring 13.

The touchdown ring 13 therefore comprises a suitably robust material with sufficient thermal inertia, such as steel, to absorb the kinetic energy of the flywheel 3 during a failure event—this energy is attenuated and distributed into the housing 1. In this way, in an embodiment where the touchdown ring 13 has a different material to that of the housing 1, the housing 1 can be manufactured from a material that is less robust than that of the touchdown ring 13, such as aluminium. This allows manufacture of a housing that is cheaper and lighter relative to a housing that is entirely made up of a more robust material, such as steel. In this embodiment, the touchdown ring 13 and the housing 1 are manufactured from the same robust material, such as steel.

The torque reaction created by the impact of the flywheel 3 is a function of the impact load of the flywheel, which creates a frictional force on the housing 1 via the touchdown region 12; and the radius at which the impact load occurs. Therefore, a torque reaction induced in the housing 1 due to a failure event can be reduced by reducing the magnitude of either of these variables.

Generally, the impact load of the flywheel is a function of the size of the clearance between the touchdown region and the contact surface of the flywheel (i.e. the amount of displacement of the flywheel from its longitudinal axis to the touchdown region), as well as the speed and mass of the flywheel. The impact load is a function of the size of the clearance because the flywheel will gain velocity as it is displaced from its longitudinal axis to the touchdown region, thus gaining potential kinetic energy which translates to the magnitude of the impact load. Therefore, the amount of velocity the flywheel is able to gain, and thus the magnitude of the impact load, is determined by the distance the flywheel is able to travel from its longitudinal axis to the touchdown region.

The radius at which the impact load occurs is a function of the diameter of the touchdown region. Therefore, a reduction in the size of the clearance and/or the diameter of the touchdown region results in a reduction in the torque reaction induced in the housing due to a failure event.

As previously described, the spatial relationships between the bearing arrangement 2*a*, the bearing support 16, the contact surface 10 and the touchdown region 12 allow a relatively small clearance 14 to be achieved, thus resulting in a reduction in the torque reaction induced in the housing relative to the same arrangement with a larger clearance.

Maintaining a relatively small clearance is also advantageous as it reduces the amount of run out of the flywheel 3 that can occur, which reduces the potential impact load of the flywheel. As before, this is because a smaller clearance permits less possible displacement of the flywheel from its longitudinal axis to the touchdown region, thus restricting the flywheels ability to gain significant velocity during a failure event.

As described above, the rim 8 is prevented from directly contacting the rim housing 20 by constraining the flywheel 3 to contact the housing 1 via the touchdown region 12 during a failure event. As the diameter of the touchdown region 12 is less than the diameter of the rim 8 (and the rim housing 20), the radius at which the impact load of the flywheel occurs is significantly less relative to the radius at which the impact occurs if the rim 8 were to contact the rim housing 20. Thus, the torque reaction in the housing is significantly reduced when constraining the flywheel in this way (i.e. via a reduced diameter touchdown region 12) relative to an arrangement where the rim 8 directly contacts the rim housing 20. Preferably, the diameter of the touchdown region 12 is ⅓ or less than the diameter of the rim 8 and/or rim housing 20.

It is simpler and less costly to constrain the flywheel 3 at a reduced diameter (i.e. proximate to the bearing arrangement 2*a*) relative to constraining the flywheel 3 at a larger diameter (i.e. at the rim housing 20). This is because the rim housing 20 may be formed from two or more pieces, which, due to an increase of tolerance stacking of these additional housing and/or flywheel components, would require a larger minimum clearance size between the flywheel 3 and the rim housing if the flywheel were to touchdown on the rim housing. These additional components may be machined at different stages of the manufacturing process resulting in much less control of the tolerances of these components. Further, differential thermal expansion and centrifugal forces of the flywheel 3 can reduce the clearance 18 between the flywheel 3 and the rim housing. A small clearance at the larger diameter of the rim housing can also result in higher air resistances on the flywheel, which is undesirable.

Means to fasten the pieces of the rim housing together (such as bolts etc) would be more likely to fail if the flywheel were to touchdown at the rim housing because the fastening means would be in closer proximity to the touchdown forces, and the touchdown load would only be supported by, for example, 1 or 2 fasteners. If the housing proximate to the touchdown region is reinforced, more material is required to do so if the flywheel were to touchdown at the larger diameter rim housing. Conversely, if the touchdown forces act at a smaller diameter, as in the present invention, reinforcing materials, such as relatively small stiffening webs, can be integrated with this area of the housing to distribute the touchdown loads into multiple fasteners of the housing that connect parts of the housing together. Thus, having touchdown forces act on a smaller diameter allows for a lower cost and lighter weight housing 1 to be achieved whilst distributing these forces across more fastening sections of the housing 1.

In some embodiments, the housing proximate to the touchdown ring 13 is structurally reinforced. This can be achieved by making this particular area of the housing thicker and/or by integrating high strength materials in the housing. Further, structurally reinforced elements, such as stiffening webs, could be integrated into the housing proximate to the touchdown ring 13 to help structurally reinforce the housing proximate to the touchdown ring 13.

Figure 6:
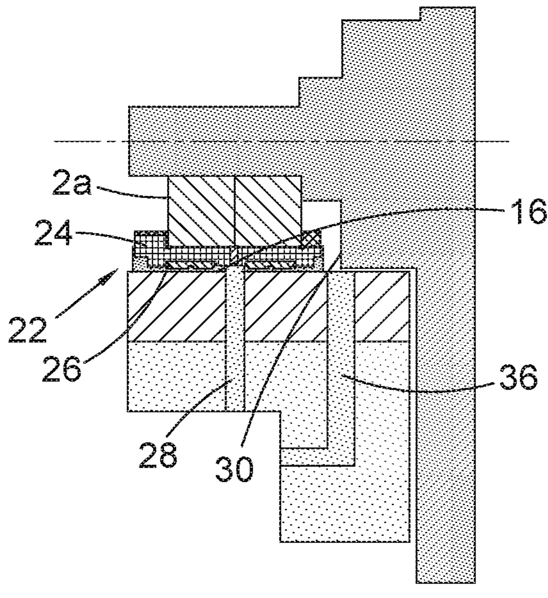
FIG. 6 illustrates an embodiment of the invention whereby the bearing arrangement comprises a damping mount.
Figure 7:
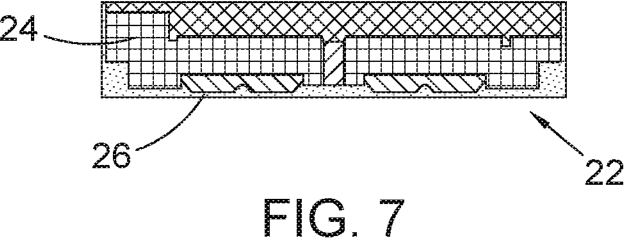
FIG. 7 illustrates a magnified view of the co-moulded elastomeric ring of FIG. 6.

In some embodiments, as illustrated by FIG. 6 and FIG. 7, the bearing arrangement 2*a* is mounted to the bearing support 16 via a damping mount 22. The damping mount 22 comprises an annual bearing carrier 24 and an elastomeric ring 26. The bearing arrangement 2*a* is mounted to the bearing carrier 24, the bearing carrier 24 is mounted to the elastomeric ring 26, and the elastomeric ring 26 is mounted to the bearing support 16.

The damping mount 24 is arranged to reduce multi-body resonance that occurs as a result of the interaction between the housing 1 and flywheel 3. This ensures that the natural modes of the flywheel do not interfere with the natural modes of the housing and vice versa, thereby allowing full speed operation of the flywheel without producing damaging resonance. This is achieved by mounting the bearing arrangement to the housing via elastomeric components, which dampen any multi-body resonance that occurs.

Gyroscopic forces induced on the flywheel 3, for example if the flywheel is mounted on a vehicle and the vehicle yaws due to navigating a corner, will result in more displacement of the rim 8 relative to the shaft 4. Therefore, due to the reduced movement of the shaft compared to the rim 8, a smaller clearance 14 may be achieved between the contact surface 10 and the touchdown region 12 in an arrangement using the damping mount 24.

In some embodiments, the elastomeric ring 26 is co-moulded onto the bearing carrier 24. Larger/wider and/or stiffer elastomeric rings may be used to help to further reduce the displacement of the shaft 4 due to gyroscopic forces. In other embodiments, the elastomeric ring 26 is a separate component.

In some embodiments, the shape of the elastomeric ring 26 is optimised, for example using voids, to accommodate/facilitate elastic and thermal expansion of the elastomeric ring 26. This may be due to thermal expansion of the ring 26 during use and/or swelling of the ring 26 due to contact with lubricant.

A lubricant system (not shown) is arranged to deliver lubricant to the bearing arrangements 2*a*, 2*b*. Preferably, lubricant being delivered to the bearing arrangements is filtered to remove unwanted debris and improve the longevity of the bearing arrangements. The delivery of lubricant to the bearing arrangements is identical in structure and function and therefore only delivery to the bearing arrangement 2*a* will be described. In this embodiment, the lubricant is an oil, such as a gear oil, a transmission fluid or a hydraulic fluid.

Figure 8:
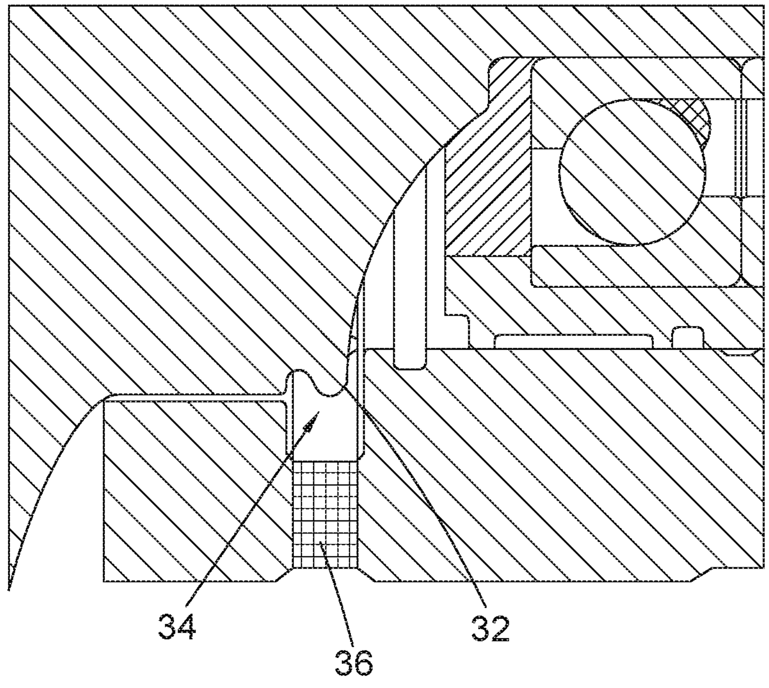
FIG. 8 illustrates the lip on a distal edge of the contact surface and a groove in the housing for collecting lubricant.

As illustrated by FIGS. 6 and 8, lubricant is delivered to the bearing arrangement 2*a* via the delivery channel 28. In this embodiment, there is no sealing arrangement between the bearing arrangement 2*a* and the touchdown ring 13. To prevent lubricant from the bearing arrangement 2*a* entering the clearance 14 (which would create high frictional losses of the flywheel), a distal edge 30 of the contact surface 10 (i.e. in an axial direction away from the centre of the flywheel 3) comprises a lip 32 that is arranged to direct run-off lubricant from the bearing arrangement 2*a* into a groove 34.

The groove 34 collects lubricant from the lip 32. The groove 34 is configured to return this lubricant to the lubricant system via a groove drainage channel 36 for subsequent circulation to the bearing arrangement 2*a*.

The lip 32 is formed by machining a recess between the distal edge 30 of the contact surface 10 and the contact surface itself. The groove 34 and groove drainage channel 36 are integral with the housing 1 and can be machined into the housing during manufacture. Centrifugal forces of the flywheel 3 cause lubricant on the flywheel 3 to flow towards the distal edge 30, where it is 'flung' or projected into the groove 34. In this way, lubricant from the bearing arrangement 2*a* is preventing from reaching the contact surface 10 and touchdown region 12.

The flywheel 3 comprises a venturi (not shown) that is arranged to create a pressure differential between the venturi and the bearing arrangement 2*a*. For example, the housing 1 can be shaped to form a venture with the rim 8 of the flywheel 3 to create the pressure differential. This ensures the pressure in the groove 34 is lower than the pressure around the centre of the flywheel, which helps to draw the lubricant into the groove drainage channel 36 for recirculation, rather than being drawn into the clearance 14, which is undesirable. In other words, the venturi is arranged to create a lower pressure region (i.e. the groove 34) into which lubricant from the bearings is exhausted.

As there is no sealing arrangement between the bearing arrangement 2*a* and the touchdown region 12, the lip 32 and the venturi ensure that lubricant can be effectively removed/recirculated without the clearance 14 filing up with lubricant. In this way, an air gap can be maintained which helps to minimise drag on the flywheel 3—lubricant on the flywheel 3 would increase drag on the flywheel 3.

In some embodiments, the housing 1 between bearing arrangement 2*a* and touchdown ring 13 may comprise one or more drainage channels (not shown) to facilitate capture and recirculation of any excess lubricant, which helps to prevent lubricant reaching the flywheel. Further, the touchdown ring 13 and/or bearing support 16 may comprise one or more lubricant channels (not shown) to facilitate lubricant flow to the bearing arrangement 2*a*.

In some embodiments, there may be a sealing arrangement between the bearing arrangement 2*a* and the touchdown ring 13 which seals against the shaft 4 and the housing 1—there is a similar sealing arrangement on the opposing side of the flywheel 3. In other embodiments, there may a sealing arrangement proximate to an end of the bearing arrangement 2*a* that is distal from the flywheel 3 (i.e. an end that faces outwardly, away from the flywheel) which seals against the shaft 4 and the housing 1—there is a similar sealing arrangement on the opposing side of the flywheel 3.

In some embodiments, there may be no lubricant system that delivers lubricant to the bearing arrangements 2*a*, 2*b*. In this case, a solid or semisolid lubricant, such as grease, is applied to the bearing arrangements 2*a*, 2*b* during assembly of the system. The applied lubricant during assembly may last the lifetime of the system, i.e. reapplication of the lubricant to the bearing arrangements may not be necessary.

In some embodiments, surfaces of the flywheel 3 and/or the touchdown region 12 may comprise a coating to reduce their operational friction, i.e. to reduce friction during contact between the contact surface 10 the touchdown surface 12. For example, these surfaces could comprise Ultra-low Friction Diamond-like Carbon (DLC) or be carburised. In some embodiments, the touchdown ring 13 comprises a low friction material that is durable for high energy events and stable at high operating temperatures (such as at least 400 degrees C., ideally at least 1000 degrees C.). Preferably, this material has a coefficient of friction of less than 0.25. In this way, the flywheel 3 is more stable as it contacts the touchdown ring 13 (relative to arrangements with higher coefficients of friction). In some embodiments, the material is additionally or alternatively a low thermal conduction material, preferably lower than steel (such as less than 45 watts per meter kelvin, ideally less than 10 watts per meter kelvin). In this way, most of the heat energy generated from contact between the flywheel and touchdown ring is transferred into the flywheel, which typically has a high mass (relative to the touchdown ring and surrounding housing), which therefore readily absorbs the heat energy. For example, the material may be carbon graphite, such as FH71 or FH71A.

In some embodiments, a controller may be integrated with the flywheel that is arranged to cease operation of the flywheel in response to detecting a torque reaction of the flywheel and/or housing above a pre-determined torque reaction threshold.

In summary, the positioning and structure of the touchdown ring 13 allows impact forces of the flywheel, during a failure event, to be more optimally controlled and distributed into the housing 1. This results in a mounting system of the flywheel which is less likely to fail during a failure event, whilst minimising the cost, to manufacture, and weight of the mounting system.

The invention claimed is:

1. Apparatus for containing a flywheel comprising:
- a flywheel;
- a shaft;
- a bearing arrangement for supporting the shaft; and
- a housing for housing the flywheel, the shaft and the bearing arrangement;
- wherein the flywheel is mounted on the shaft, the shaft is mounted to the bearing arrangement, and the bearing arrangement is mounted to the housing;
- wherein the flywheel has a rim formed by a circumferential face of the flywheel, and a hub formed by a radially central region of the flywheel, the hub being wider, axially, than the rim such that a circumferential contact surface is formed by the hub that is coaxial with the rim;
- wherein the housing comprises an annular force transfer region that faces, and is concentric with, the contact surface, a diameter of the force transfer region being greater than a diameter of the contact surface; and
- wherein, in use, excessive radial movement of the flywheel results in the contact surface contacting the transfer region.

2. Apparatus according to claim 1, wherein a clearance between the contact surface and the transfer region is less than 0.2 mm.

3. Apparatus according to claim 1, further comprising a lubricant system that is arranged to circulate lubricant to the bearing arrangement, wherein a distal edge of the contact surface comprises a lip for preventing lubricant from the bearing arrangement reaching the clearance.

4. Apparatus according to claim 3, wherein the housing proximate to the lip comprises a groove for collecting lubricant from the lip.

5. Apparatus according to claim 4, wherein the groove is configured to drain collected lubricant to the lubricant system via a groove drainage channel.

6. Apparatus according to claim 3, wherein the housing between the bearing arrangement and the transfer region comprises one or more drainage channels to drain lubricant to the lubricant system.

7. Apparatus according to claim 3, wherein the transfer region comprises a channel to facilitate lubricant circulation to the bearing arrangement.

8. Apparatus according to claim 3, wherein the housing is shaped to create a venturi with the flywheel that is arranged to maintain the groove at a low-pressure for drawing lubricant from the bearing arrangement.

9. Apparatus according to claim 1, wherein the transfer region is formed via an annular member that is mounted to the housing.

10. Apparatus according to claim 1, wherein the transfer region is formed via an annular member that is integral with the housing.

11. Apparatus according to claim 1, wherein the housing comprises a bearing support upon which the bearing arrangement is mounted.

12. Apparatus according to claim 11, wherein the bearing arrangement is mounted to the bearing support arrangement via an elastomeric component.

13. Apparatus according to claim 12, wherein the bearing arrangement is mounted to the elastomeric component via a bearing carrier.

14. Apparatus according to claim 13, wherein the elastomeric component is co-moulded onto the bearing carrier.

15. Apparatus according to claim 12, wherein the elastomeric component comprises voids to facilitate elastic or thermal expansion of the elastomeric component.

16. Apparatus according to claim 1, wherein the transfer region is located between the bearing arrangement and the flywheel.

17. Apparatus according to claim 1, wherein the housing proximate to the transfer region is structurally reinforced by thicker and/or denser materials and/or structural elements.

18. Apparatus according to claim 1, wherein at least one of: the flywheel, and the transfer region comprise a coating to reduce friction during contact between the contact surface and the transfer region.

19. Apparatus according to claim 1, wherein the transfer region comprises a material that is more durable than the housing.

20. Apparatus according to claim 1, further comprising a controller arranged to cease operation of the flywheel in response to detecting a torque reaction of the flywheel and/or housing above a pre-determined torque reaction threshold.

21. Apparatus for containing a flywheel comprising:

a flywheel;

a shaft;

a bearing arrangement for supporting the shaft; and a housing for housing the flywheel, the shaft and the bearing arrangement;

wherein the flywheel is mounted on the shaft, the shaft is mounted to the bearing arrangement, and the bearing arrangement is mounted to the housing;

wherein the flywheel has a rim formed by a circumferential face of the flywheel, and a hub formed on both axial sides of a radially central region of the flywheel, the hub being wider, axially, than the rim such that a circumferential contact surface is formed on both axial sides of the radially central region of the flywheel by the hub that is coaxial with the rim, the rim being between the axial sides of the radially central region of the flywheel;

wherein the housing comprises an annular force transfer region that faces, and is concentric with, the contact surface, a diameter of the force transfer region being greater than a diameter of the contact surface; and wherein, in use, excessive radial movement of the flywheel results in the contact surface contacting the transfer region.

22. Apparatus for containing a flywheel comprising:

a flywheel;

a shaft;

a bearing arrangement for supporting the shaft; and a housing for housing the flywheel, the shaft and the bearing arrangement;

a lubricant system that is arranged to circulate lubricant to the bearing arrangement, wherein a distal edge of the contact surface comprises a lip for preventing lubricant from the bearing arrangement reaching the clearance;

wherein the flywheel is mounted on the shaft, the shaft is mounted to the bearing arrangement, and the bearing arrangement is mounted to the housing;

wherein the flywheel has a rim formed by a circumferential face of the flywheel, and a hub formed by a central region of the flywheel, the hub being wider, axially, than the rim such that a circumferential contact surface is formed by the hub that is coaxial with the rim;

wherein the housing comprises an annular force transfer region that faces, and is concentric with, the contact surface, a diameter of the force transfer region being greater than a diameter of the contact surface; and wherein, in use, excessive radial movement of the flywheel results in the contact surface contacting the transfer region.

* * * * *